United States Patent [19]

Takanashi et al.

[11] Patent Number: 4,642,677

[45] Date of Patent: Feb. 10, 1987

[54] COLOR TV CAMERA WITH PLURAL SOLID STATE IMAGING DEVICES MUTUALLY HORIZONTALLY DISPLACED AND ASSOCIATED FILTERS OF VERTICALLY-ORIENTED COLOR STRIPES

[75] Inventors: Itsuo Takanashi; Tadayoshi Miyoshi, both of Yokohama; Shintaro Nakagaki, Fujisawa; Hiroshi Nishiyama, Kanagawa, all of Japan

[73] Assignee: Victor Company of Japan, Ltd., Japan

[21] Appl. No.: 632,873

[22] Filed: Jul. 20, 1984

[30] Foreign Application Priority Data

Jul. 21, 1983 [JP] Japan ................................. 58-133397
Jul. 25, 1983 [JP] Japan ................................. 58-135428

[51] Int. Cl.$^4$ .................... H04N 9/09; H04N 9/04; H04N 9/097
[52] U.S. Cl. ......................................... 358/43; 358/41; 358/55
[58] Field of Search ................. 358/41, 43, 44, 48, 358/50, 52, 55, 213

[56] References Cited

U.S. PATENT DOCUMENTS

| 3,975,760 | 8/1976 | Yamanaka et al. | 358/50 |
| 4,016,598 | 4/1977 | Yamanaka | 358/41 |
| 4,183,052 | 1/1980 | Yamanaka et al. | 358/50 |
| 4,334,238 | 6/1982 | Morishita et al. | 358/43 |

FOREIGN PATENT DOCUMENTS

| 44514 | 4/1977 | Japan | 358/43 |
| 158586 | 12/1981 | Japan | 358/44 |

Primary Examiner—James J. Groody
Assistant Examiner—Randall S. Svihla
Attorney, Agent, or Firm—Lowe, Price, LeBlanc, Becker & Shur

[57] ABSTRACT

In a color television camera, a light ray from an object to be taken is split into a plurality of rays to be respectively incident on two or more solid-state imaging devices each equipped with a color separation stripe filter where the imaging devices are positioned so that pixels thereof are horizontally shifted by a predetermined distance from pixels of remaining imaging devices with respect to an image applied thereto. The imaging devices are driven in a sequence, and output signals therefrom are sampled in a sequence so as to produce a single multi-color video signal by combining the plurality of sampled signal components. With this arrangement, the frequency of color signal components within the multi-color video signal is increased from the frequency of each of the output signals from the imaging device. The sampled signal components may be further sampled so that a plurality of color signals corresponding to the colors of the color stripe filters are obtained and their levels are respectively adjusted for obtaining level-adjusted color signal which are then combined to produce a single multi-color video signal.

15 Claims, 9 Drawing Figures

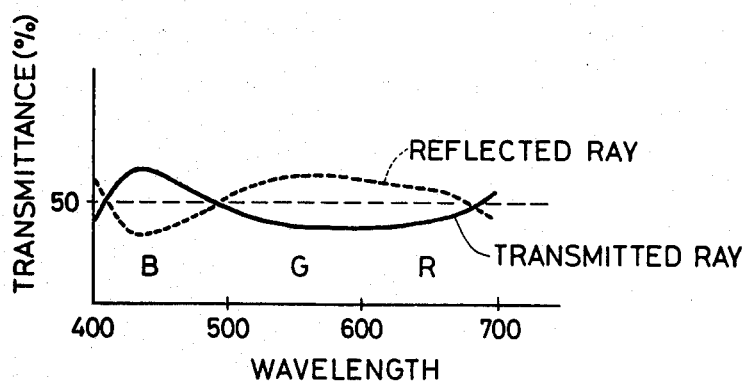

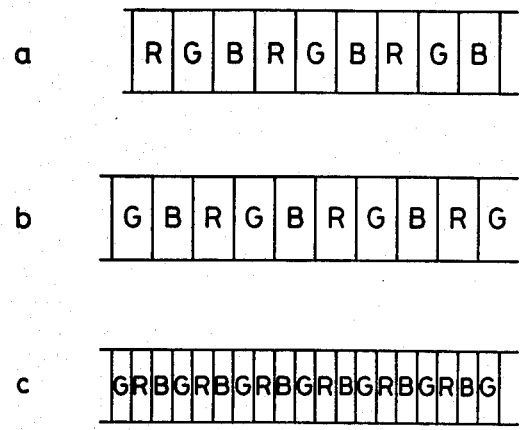

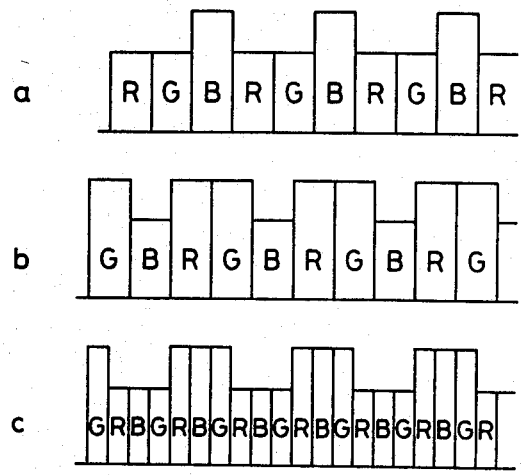

COLOR TV CAMERA WITH PLURAL SOLID STATE IMAGING DEVICES MUTUALLY HORIZONTALLY DISPLACED AND ASSOCIATED FILTERS OF VERTICALLY-ORIENTED COLOR STRIPES

BACKGROUND OF THE INVENTION

This invention relates generally to color television cameras, and more particularly to such cameras having two or more solid-state imaging devices.

Solid-state imaging devices, such as CCD imagers, are recently used as image-pickup devices of television cameras. One problem involved in the application of such solid-state imaging devices to television cameras is that the resolution of an image obtained from the output signal of such solid-state imaging device is not as high as conventional pickup tubes. In order to better the resolution, therefore, various techniques have hitherto been taken, one of which is a pixel-offsetting method.

The pixel-offsetting method is actualized using two or more solid-state imaging devices having a number of pixels (picture elements) arranged horizontally and vertically. For instance, in a known three-chip CCD color TV camera, a CCD chip for green light (G) is positioned such that its horizontal position with respect to an incident image of a subject to be imaged is shifted by half pitch of pixels in the horizontal direction from two other CCD chips for red light (R) and blue light (B) so that signals from the red and blue pixels are shifted by half a period which corresponds to the pitch of the pixels with respect to signals from green pixels thereby reducing aliasing noise and improving resolution. On the other hand, in a known two-chip CCD color TV camera, a CCD chip for green light (G) is positioned such that its horizontal position with respect to an incident image of a subject to be imaged is shifted by half pitch of pixels in horizontal direction from the other CCD chip for red light (R) and blue light (B) where a color separation filter for transmitting green light is applied to the CCD chip for green light, and another color separation filter for causing the other CCD chip for red and blue light to produce an output picture signal including red signal components and blue signal components which are line-sequentially outputted, is applied to the other CCD chip.

However, even though such spatially pixel-offsetting method is used, since the fundamental frequency of color signals obtained from such known two or more chips of solid-state imaging devices is the same as that in a conventional TV camera involving no pixel-offsetting, it has been difficult to obtain high-quality color pictures with such TV cameras using two or more solid-state imaging devices.

SUMMARY OF THE INVENTION

The present invention has been developed in order to remove the above-described drawbacks inherent to the conventional color television cameras using two or more solid-state imaging devices.

It is, therefore, an object of the present invention to provide a new and useful color television camera using two or more solid-state imaging devices.

According to a feature of the present invention light ray from a subject to be taken is split into a plurality of rays to be respectively incident on two or more solid-state imaging devices each equipped with a color separation stripe filter where the imaging devices are positioned so that pixels thereof are horizontally shifted by a predetermined distance from pixels of remaining imaging devices with respect to an image applied thereto. The imaging devices are driven in a sequence, and output signals therefrom are sampled in a sequence so as to produce a single multi-color video signal by combining the plurality of sampled signal components. With this arrangement, the frequency of color signal components within the multi-color video signal are increased from the frequency of each of the output signals from the imaging device.

According to another feature of the present invention, the sampled signal components are further sampled so that a plurality of color signals corresponding to the colors of the color stripe filters are obtained and their levels are respectively adjusted for obtaining level-adjusted color signals which are then combined to produce a single multi-color video signal.

In accordance with the present invention there is provided a color television camera comprising: an optical system for splitting incident light ray an object into N rays wherein N is a positive integer greater than 1, each of the N rays generating an identical image of said object or the mirror-image thereof. N solid-state imaging devices are provided, having identical pixel configurations respectively responsive to said N rays from said optical system. Each of said imaging devices has rows of pixels arranged in horizontal and vertical directions, said imaging devices being horizontally displaced from each other with respect to the identical or mirror image by 1/N horizontal pitch of said pixel row. N color separation stripe filters have mutually identical or mirror-image structures of a predetermined repetitive pattern of color stripes extending vertically, said color stripes having a horizontal width substantially equal to said horizontal pitch of said row of pixels of said imaging devices. The N color separation stripe filters are respectively disposed in front of said N imaging devices so that said rays are respectively subjected by said N color separation stripe filters before projection onto said N imaging devices. Pulse generating means is provided for producing N pulse trains or N phases for respectively driving said N imaging devices so that output signals having a predetermined phase difference therebetween are derived from said N imaging devices. N sampling circuits are provided for sampling respectively said output signals from said N imaging devices such that each of said output signals from said N imaging devices is sampled at a predetermined interval so that information is derived corresponding to each pixel thereof. The N sampling circuits are arranged to be successively operated in a predetermined order and combining means responsive to output signals from said N sampling circuits produce a single multi-color video signal.

In accordance with the present invention there is also provided a color television camera comprising: an optical system for splitting incident light ray from an object into N rays wherein N is a positive integer greater than 1, each of said N rays causing an identical image of said object or the mirror-image thereof. N solid-state imaging devices have an identical pixel configuration, respectively responsive to said N rays from said optical system, each of said imaging devices having rows of pixels arranged in horizontal and vertical directions. The imaging devices are horizontally displaced from each other with respect to the identical or mirror image by 1/N horizontal pitch of said row of pixels, and N color separation stripe filters, having mutually identical or mirror-image structures of a predetermined repetitive pattern of color stripes extending vertically. The color stripes have a horizontal width substantially equal to said horizontal pitch of said row of pixels of said imaging devices, said N color separation stripe filters being respectively disposed in front of said N imaging devices so that said rays are respectively subjected to said N color separation stripe filters before projecting into said N imaging devices. Pulse generating means are provided for producing N pulse trains of N phases for respectively driving said N imaging devices so that output signals having a predetermined phase difference therebetween are derived from said N imaging devices. N sampling circuits for sampling respectively said output signals from said N imaging devices such that each of said output signals from said N imaging devices is sampled at a predetermined interval and so that information corresponding to each pixel thereof is derived. The N sampling circuits are arranged to be successively operated in a predetermined order. 3N sampling circuits are responsive to output signals from said N sampling circuits, each three sampling circuits of said 3N sampling circuits being responsive to an output signal from one of said N sampling circuits so as to derive three different color output signals. The 3N sampling circuits are arranged to be successively operated in a predetermined order. 3N level adjusting circuits are respectively responsive to 3N output signals from said 3N sampling circuits for adjusting the level of their output signals. Combining means are responsive to output signals from said 3N level adusting circuits for producing a single multi-color video signal.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
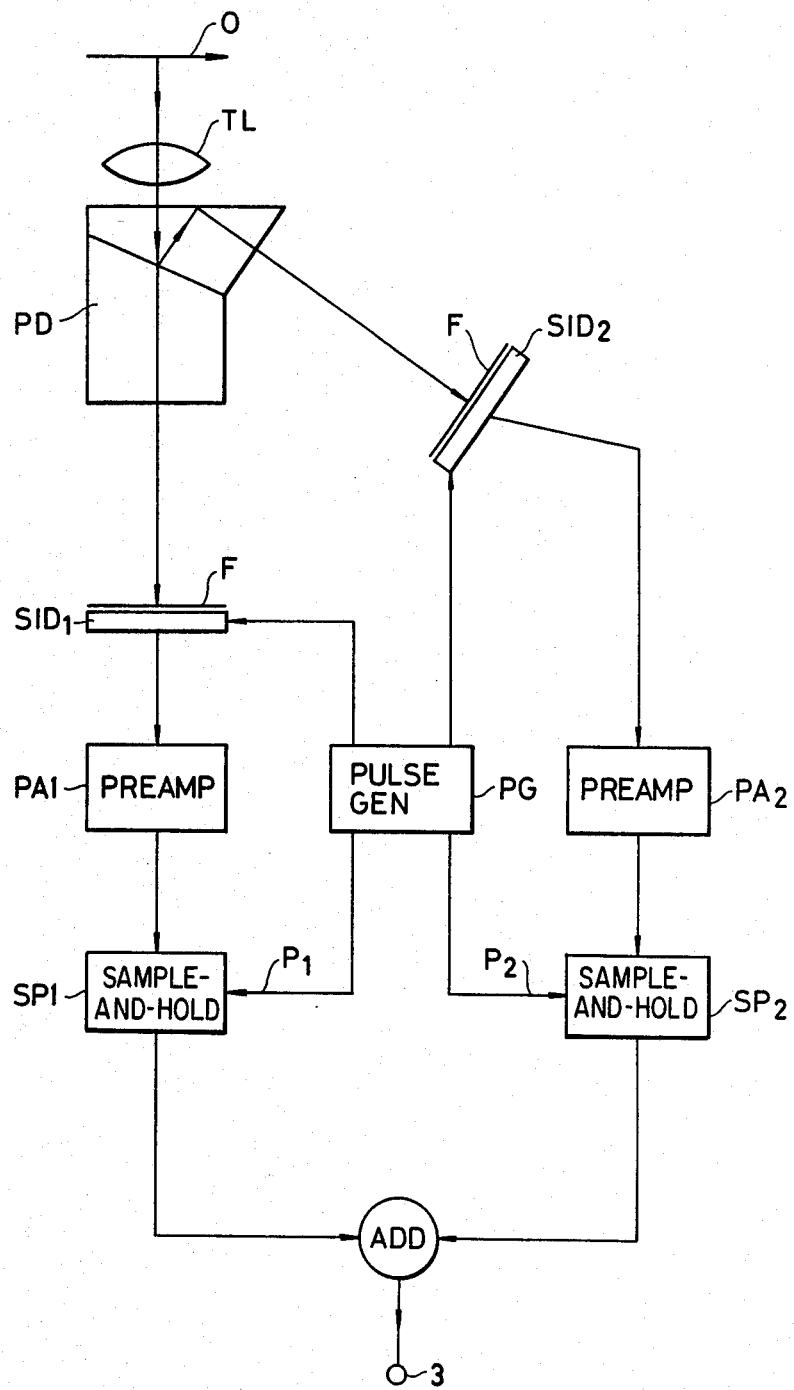
FIG. 1 is a schematic block diagram of an embodiment of the present invention.

Referring now to FIG. 1, a schematic block diagram of an embodiment of the color TV camera according to the present invention is shown. In this embodiment, two solid-state imaging devices, such as CCD chips, SID1 and SID2 are used for receiving incident light rays from an optical system including a taking lens TL and a light path splitting device PD with prisms and semitransparent mirror. The reference O indicates an object to be imaged, and light ray from the object O incident on the optical system is split into two rays both including all color information. The reference F indicates color separation filters which are associated with the two imaging devices SID1 and SID2. The reference PA1 and PA2 are preamplifiers respectively responsive to output signals from the imaging devices SID1 and SID2, and the references SP1 and SP2 being sample-and-hold circuits respectively responsive to output signals from the preamplifiers PA1 and PA2. The reference PG is a pulse generator for generating pulse trains used for driving the imaging devices SID1 and SID2 as well as the sample-and-hold circuits SP1 and SP2. The reference ADD is an adder responsive to output signals from the sampling circuits SP1 and SP2.

The two solid-state imaging devices SID1 and SID2 implemented by two CCD chips are positioned so that a substantially identical optical image of the object O is applied thereto from the optical system. The two CCD imagers SID1 and SID2 have an identical structure with pixels arranged in horizontal and vertical directions so as to function as area image sensors, and are positioned with respect to the image of the object O such that the position of a pixel corresponding to a given portion of the image incident on one CCD chip SID1 is shifted horizontally by half pitch of the pixel from the other CCD chip SID2 as seen in FIG. 2.

Figure 2:
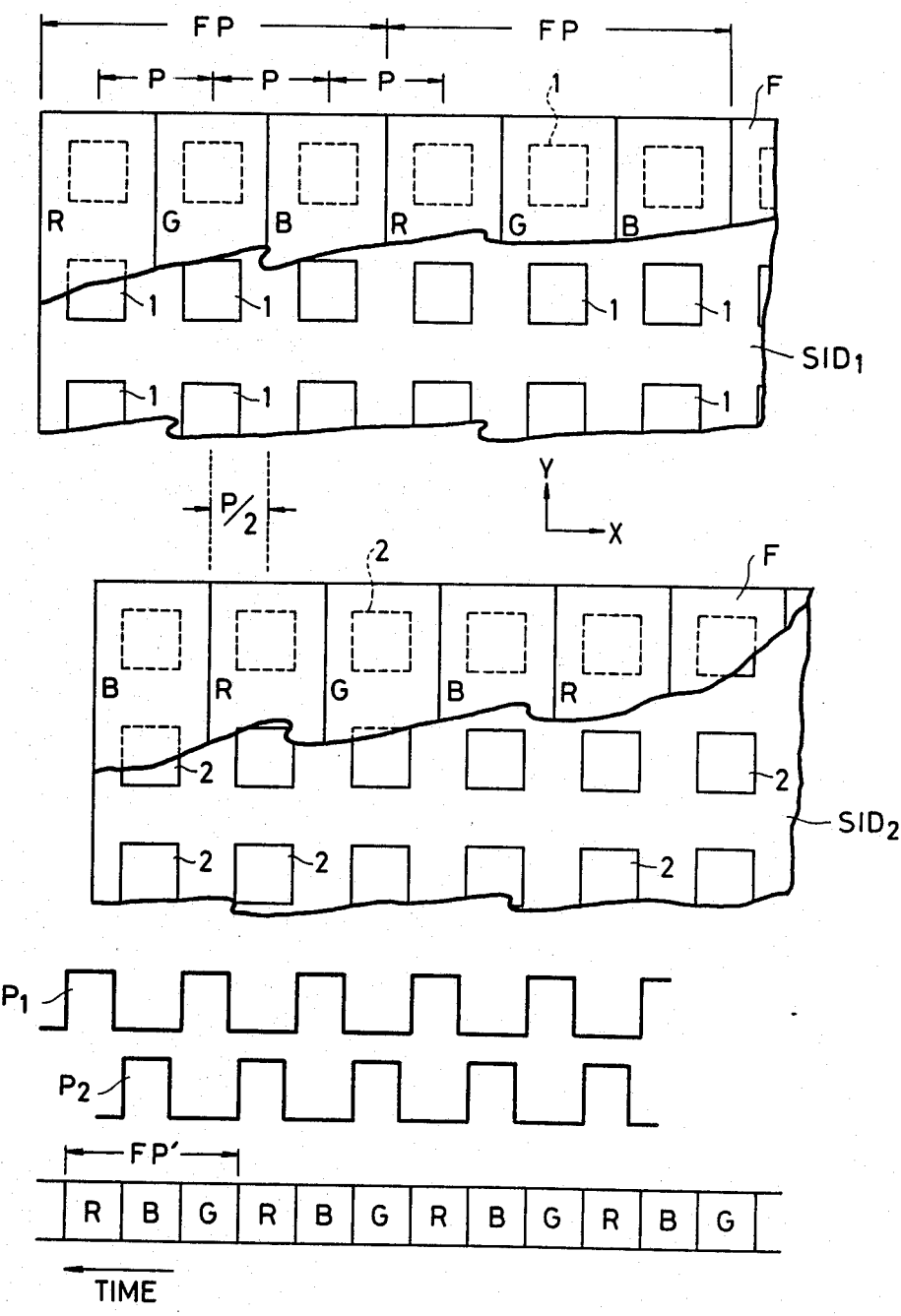
FIG. 2 is a schematic diagram showing the positional relationship between two imaging devices used in the embodiment of FIG. 1, and output signals derived respectively from the two imaging devices.

In FIG. 2, the CCD imagers SID1 and SID 2 are partially shown to have rectangular openings 1 and 2 respectively which openings 1 and 2 correspond pixels of the two CCD chips SID1 and SID2. An arrow X indicates the horizontal direction while another arrow Y indicates the vertical direction. These pixels 1 and 2 which have substantially the same size, are arranged equidistantly in line in both the horizontal and vertical directions, and the distance between two adjacent pixels in horizontal direction is represented by a reference P. This distance P represents a horizontal pitch of the pixels, and will be simply referred to as pitch P hereinafter. The two CCD chips are positioned so that they are shifted from each other horizontally by half pitch (P/2) with respect to incident rays of an identical image. FIG. 2 shows such a state schematically.

Both the CCD imagers SID1 and SID2 are respectively covered by the color separation filters F having color stripes extending vertically and having a horizontal width substantially equal to the pitch P. In the illustrated example of FIG. 2, these color stripes are red R, green G and blue B, and these color stripes R, G, B are arranged in a predetermined order to form a predetermined repetitive stripe pattern. Since the number of colors of these color stripes R, G, B is three in the illustrated example, repetition pitch FP of the color stripes is 3P.

Figure 3:
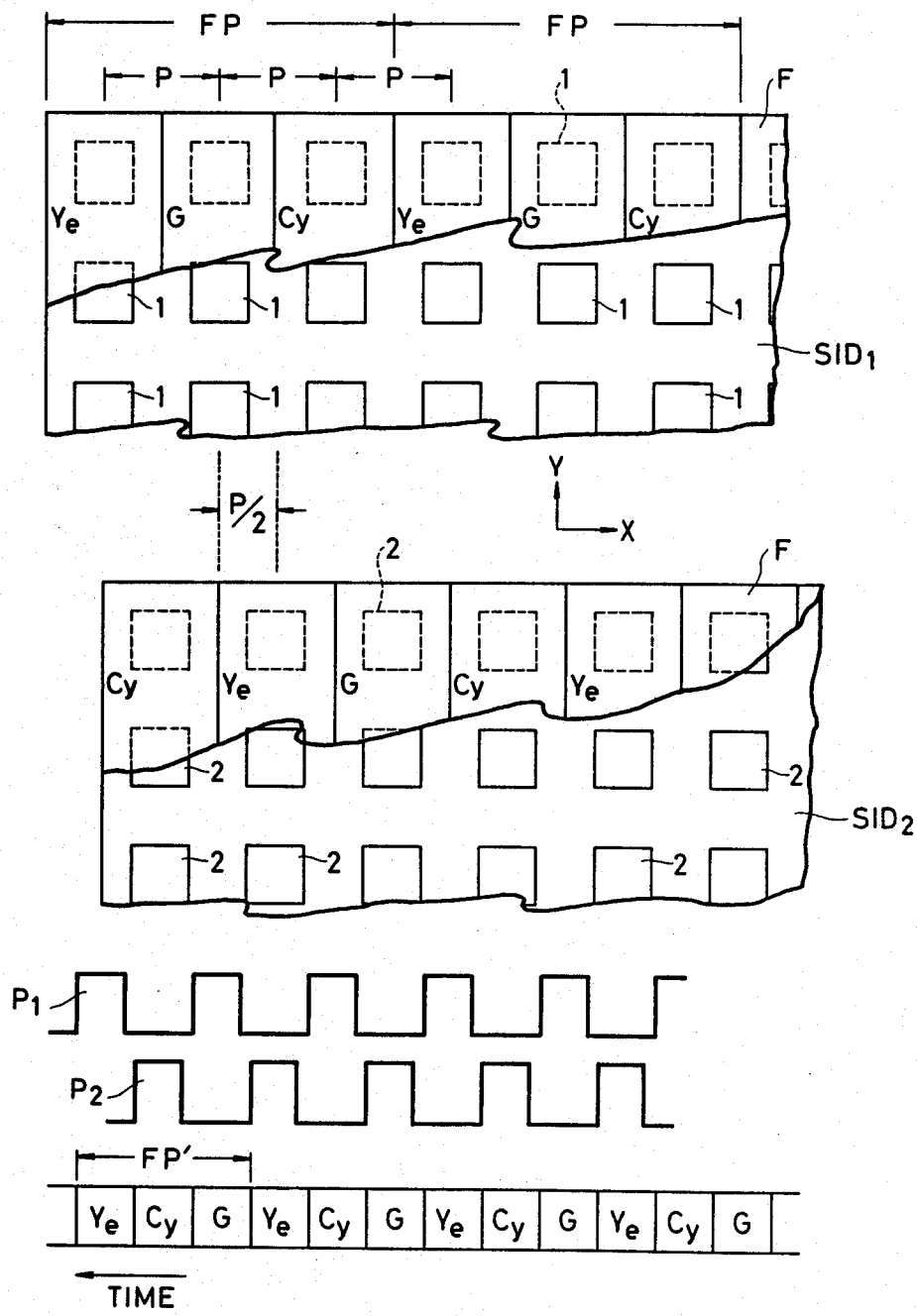
FIG. 3 shows a variation of the embodiment of FIG. 2.

FIG. 3 shows a variation of the above-described embodiment, and this variation differs from the arrangement of FIG. 2 in that the color stripes have three colors of yellow Ye, green G and cyan Cy. Remaining structure of the arrangement of FIG. 3 is the same as that of FIG. 2 so that the arrangement of FIG. 3 may be applied to the embodiment of FIG. 1 in the same manner as the arrangement of FIG. 2.

Since the arrangement of FIG. 3 is substantially the same as that of FIG. 2 except the colors of the color stripe filters F, the embodiment of FIG. 1 will be described in connection with only the arrangement of FIG. 2. Assuming that the arrangement of color separation filters F and the CCD imagers SID1 and SID2 of FIG. 2 is used in the embodiment of FIG. 1, this embodiment operates as follows.

The pulse generating circuit PG is arranged to produce two sets of pulse trains which are respectively fed to the CCD imagers SID1 and SID2 as drive pulses, and a pair of pulse trains P1 and P2 which are respectively fed to the sample-and-hold circuits SP1 and SP2 as sampling signals. The pulse signals fed to the CCD imagers SID1 and SID2 have a phase difference of 180 degrees therebetween, while the other pulse trains P1 and P2 fed to the sample-and-hold circuits SP1 and SP2 also have a phase difference of 180 degrees. Furthermore, the two sets of pulse signals and the pair of pulse signals are synchronized and have an identical frequency.

In response to the drive pulses from the pulse generating circuit PG, the CCD imagers SID1 and SID2 perform charge transforming operation as is well known so as to respectively output an image signal of multi-color state. These image signals derived from the CCD imagers SID1 and SID2 are respectively fed to the preamplifiers PA1 and PA2 to be respectively amplified therein. Output signals from the preamplifiers PA1 and PA2 are fed respectively to the sample-and-hold circuits SP1 and SP2 to be sampled in response to the sampling pulse signals which are designated at P1 and P2 in FIG. 1, and their timing relationship is shown in FIG. 2. The multi-color signals respectively sampled by the sample-and-hold circuits SP1 and SP2 are then fed to the adder ADD in which these two multi-color signals are combined with each other through addition. As a result, a single multi-color video signal is developed at an output terminal 3 of the adder ADD. This multi-color video signal is processed by way of a known video signal processing circuit so as to derive a luminance signal and three-primary color signals. The multi-color video signal obtained at the output terminal of the adder ADD includes information or signal components of red rays, green rays and blue rays which are successively arranged along time base as seen at the bottom in FIG. 2. In detail, the leftmost red ray information R is derived from the leftmost pixel 1 of the first CCD chip SID1 which pixel is covered by the red stripe, and the second blue ray information B is derived from the leftmost pixel 2 of the second CCD chip SID2. In this way, alternative outputs from the CCD imagers SID1 and SID2 are combined into a single multi-color video signal.

As a result, the single multi-color video signal obtained through the adder ADD includes three-color signal components which are successively arranged in a predetermined order such as R - B - G - R - B - G assuming that the charges within the CCD chips SID1 and SID2 are shifted to the left in FIG. 2 in response to the drive pulses. The reference FP' in FIG. 2 represents the repetition pitch of the three color signal components within the multi-color video signal from the adder ADD, and it will be noted that this repetition pitch FP' is substantially one half the repetition pitch FP of the color stripes R, G, B of the color separation stripe filters F. This means that the fundamental frequency of respective color signals appearing within the single multi-color video signal is doubled from the frequency of the same derived from each of the CCD imaging devices SID1 and SID2. As a result, the circuit arrangement of FIG. 1 is capable of producing an output multi-color video signal which is equivalent to a multi-color video signal derived from a single CCD imager having pixels whose number equals the total number of pixels of the two CCD imagers SID1 and SID2. In other words, the arrangement of FIG. 1 provides a high quality output multi-color video signal with two CCD chips each having a relatively small number of pixels. Since fabrication of CCD chips having a large number of pixels is difficult, and since the larger the number of pixels, the higher the cost of CCD chips, the instant invention provides an effective way for increasing resolution without cost increase.

In the above-described embodiment of FIG. 1, although the optical system comprises prisms for splitting incident light ray into two, other optical elements may be used. For instance, when a half-mirror is used in place of the light path splitting device PD for splitting the light ray from the object O, two images obtained by split light rays have a relationship of mirror-image therebetween. In such a case, solid-state imaging devices disclosed in applicants' prior patent applications may be used, these prior applications being No. 58-119774 filed July 1, 1983 (published Feb. 14, 1985, as Kokai No. 60-29093), No. 58-122862 filed July 6, 1983 (published Feb. 14, 1985, as Kokai No. 60-29094), No. 58-124436 filed July 8, 1983 (published Jan. 28, 1985, as Kokai No. 60-16773) all in Japan; U.S. patent application Ser. No. 626,043 filed June 29, 1984; EPO application No. 840304482.7 filed June 29, 1984; and Canadian application No. 457929 filed June 29, 1984.

Figure 4:
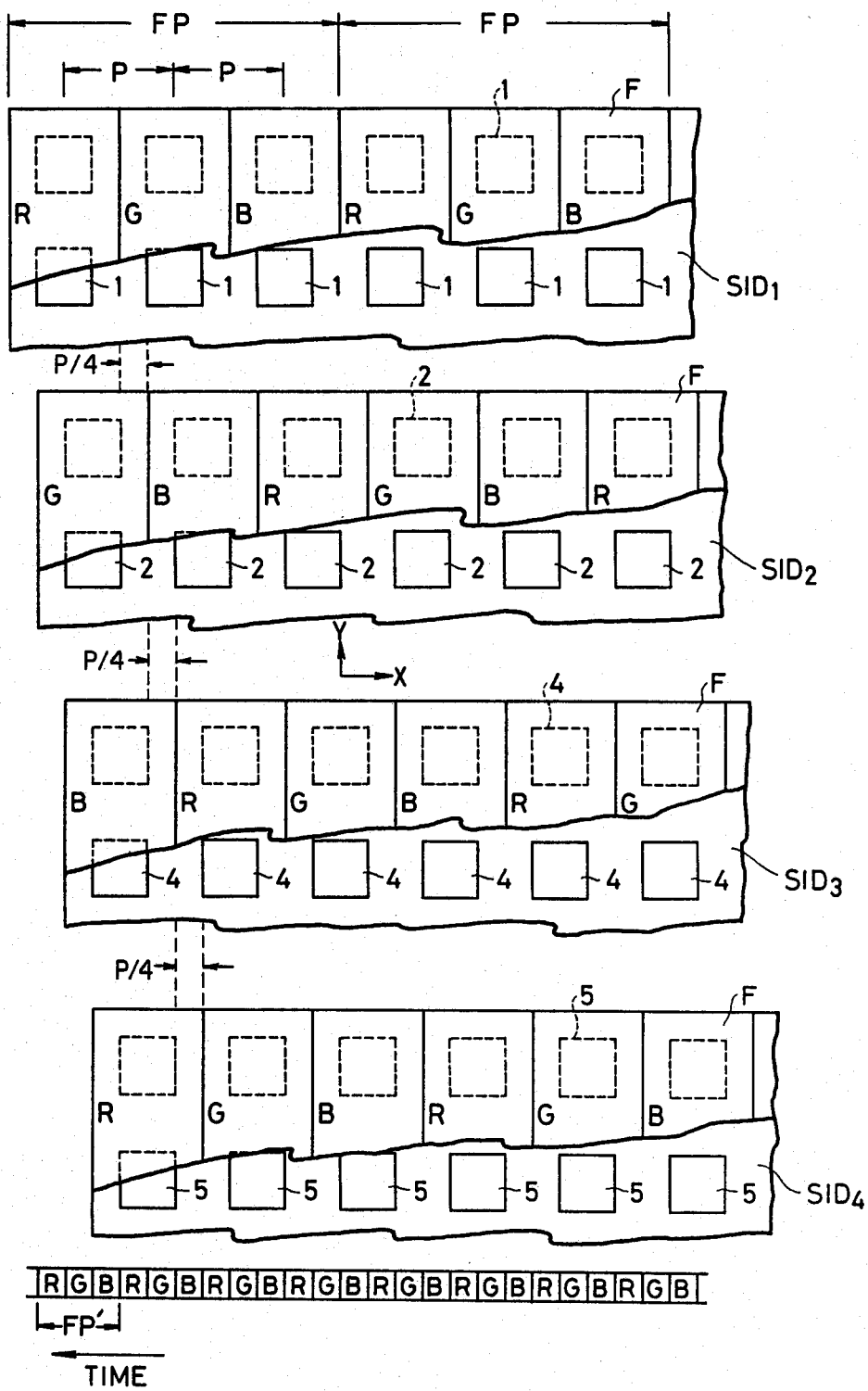
FIG. 4 shows an arrangement of four imaging devices used in another embodiment.

Reference is now made to FIG. 4 showing another embodiment using four solid-state imaging devices SID1 to SID4. These four imaging devices SID1 to SID4 each having the same structure as the CCD chip described in connection with the first embodiment are arranged to receive respectively four light rays split from a single light ray from the object O. More particularly, the embodiment of FIG. 1 may be modified such that the optical system produces four light rays to be fed to the four CCD chips SID1 to SID4 which are spatially offset by a quarter pitch (P/4) rather than a half pitch. The CCD chips SID1 to SID4 are responsive to drive pulse trains having phase difference of 90 degrees, while output signals from the four CCD chips SID1 to SID4 are respectively sampled in response to sampling pulse signals having phase difference of 90 degrees. Then output signals from four sample-and-hold circuits respectively responsive to the output signals from the four CCD imagers SID1 and SID4 are combined by an adder in the same manner as in FIG. 1 so as to produce a single multi-color video signal. As a result, the multi-color video signal obtained at the output of the adder includes red ray information, green ray information and blue ray information as seen at the bottom of FIG. 4, where the repetition pitch FP' of the color signal components included in the multi-color video signal substantially equals one-fourth the repetition pitch FP of the color stripes of the color separation stripe filters F. This means that the frequency of color signal components is four times the frequency of the color signals from each of the CCD imagers SID1 and SID4.

In this embodiment of FIG. 4, any optical system for producing four light rays may be used in the same manner as in the embodiment of FIG. 1.

Figure 5:
FIG. 5 is an explanatory diagram showing wavelength response of the prism used in the embodiment of FIG. 1.
Figure 6:
FIG. 6 is a diagram showing a desired output signal response from the two imaging devices of FIG. 2.
Figure 7:
FIG. 7 is a diagram showing an actual output signal response from the two imaging devices of FIG. 2.

Another embodiment will be described with reference to FIGS. 5 through 9. Prior to describing this embodiment, let us consider the transmittance characteristic of the optical system, especially the prisms, shown in FIG. 1 with respect to wavelength for a better understanding of this embodiment. FIG. 5 shows a desired wavelength response by a broken line and actual wavelength resonses of light rays respectively transmitted through and reflected twice at the prisms used as light ray splitting device of the optical system by a solid curve and a dotted curve. As seen in FIG. 5, the wavelength response of light rays transmitted through or reflected at the prisms varies usually as a function of wavelength of the incident light. Accordingly, the wavelength response of one light ray transmitted via the prism PD to the first CCD chip SID1 is different from the wavelength response of the other light ray reflected at the prism PD to be applied to the second CCD chip SID2. This state will be understood from the comparison between FIG. 6 showing ideal state and FIG. 7 showing actual state. More specifically, assuming that the color separation stripe filters F of FIG. 1 exhibits equal transmittance for all colors thereof, and assuming that white light having equal energy throughout the wavelengths thereof is incident of the optical system, if the prisms PD had an ideal wavelength response indicated at the broken line, then the intensity of respective color light rays applied to the pixels of the CCD imagers SID and SID2 would be the same throughout all the pixels as seen in "a" and "b" of FIG. 6. As a result, output signal levels from the two CCD imagers SID1 and SID2 are substantially the same throughout respective colors, and therefore the level of a combined multi-color video signal is also constant as seen in "c" of FIG. 6. In actual practice, however, due to the variation in wavelength response as indicated by the solid and dotted curves in FIG. 5, the intensity of respective color light rays incident on the pixels of the CCD imagers SID1 and SID2 varies as seen in FIG. 7 in which the reference "a", "b" and "c" indicate the same components as in FIG. 6. As will be understood from the comparison between FIGS. 6 and 7, the output multi-color video signal from the adder ADD of FIG. 1 suffers from level variation with respect to time where the variation occurs cyclically in correspondence with the repetition pitch F of the color stripes. In other words, the output multi-color video signal includes a frequency component determined by the repetition pitch F. Such a frequency component makes it difficult to increase frequency, and therefore it is desired to remove such variation.

Figure 8:
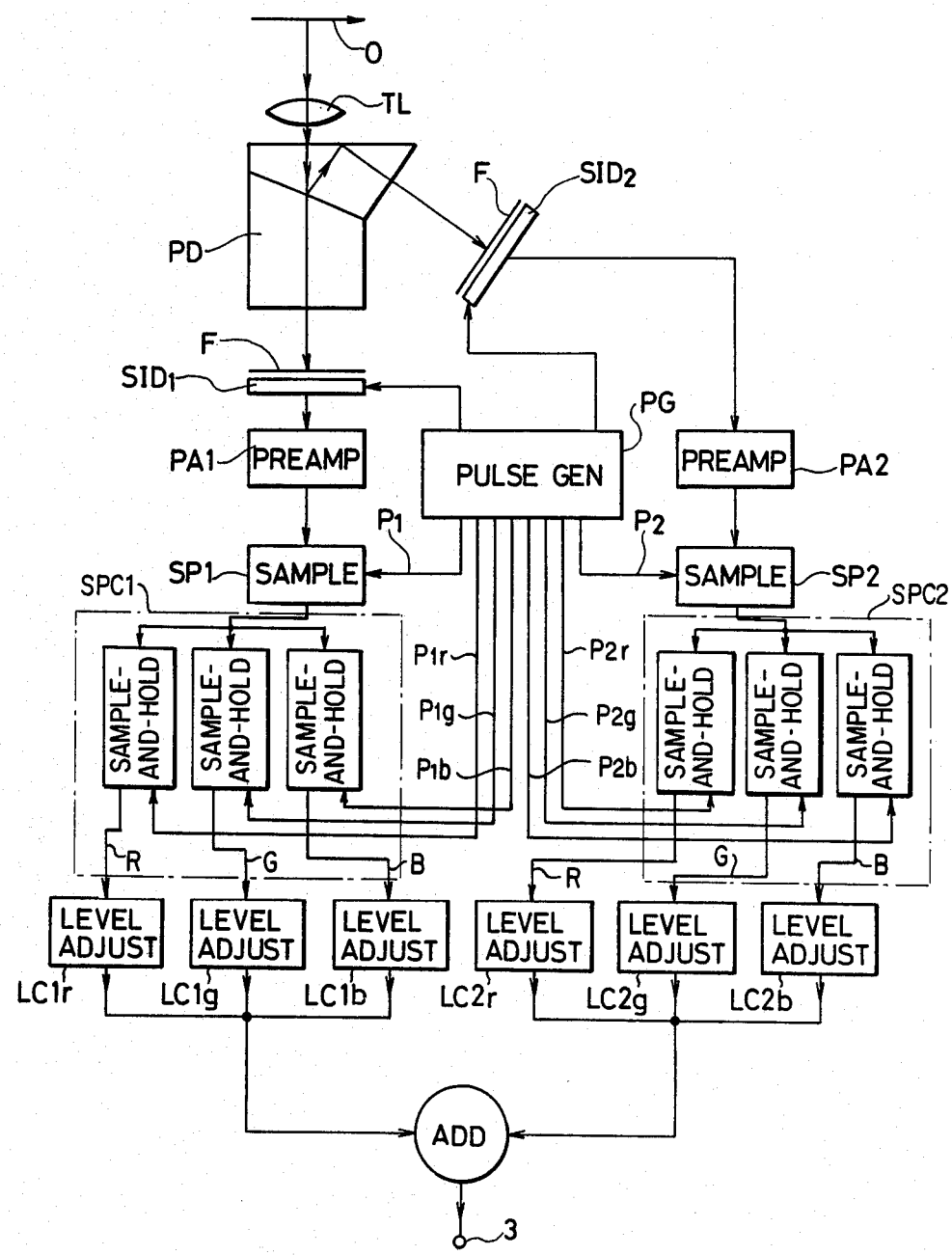
FIG. 8 is a schematic block diagram of a further embodiment of the present invention.

Hence, reference is now made to FIG. 8 showing another embodiment which obviates such variation in signal level caused from variation in light intensity. As seen in FIG. 8, this embodiment is an improvement of the first-described embodiment of FIG. 1. In detail, the optical system, the imaging devices SID1 and SID2, the preamplifiers PA1 and PA2, the sample-and-hold circuits SP1 and SP2 have the same structure as that in FIG. 1. In addition to these elements, this embodiment circuit arrangement comprises first and second sets of sampling circuits SPC1 and SPC 2 each having three sample-and-hold circuits, and six level adjusting circuits LC1r, LC1g, LC1b, LC2g and LC2b each of which may be actualized by a variable gain amplifier. The three sample-and-hold circuits of the sampling cirucit SPC1 are respectively responsive to the output signal from the sample-and-hold circuit SP1, and output signals from these three sample-and-hold circuits are respectively fed to the level adjusting circuits LC1r, LC1g and LC1b so that the amplitude of respective signals may be adjusted such that their output signal levels are substantially equal to each other when white light is applied to the optical system. The other sampling circuit SPC2 and the remaining three level adjusting circuits LC2r, LC2g and LC2b are arranged in the same manner as described in the above. Output signals from the three level adjusting circuits LC1r, LC1g and LC1b are added to each other to be a single signal which is fed to the adder ADD. Similarly, output signals from the other three level adjusting circuits LC2r, LC2g and LC2b are added to each other to be a single signal which is fed to the adder ADD. In receipt of these signals the adder ADD produces a single multi-color video signal whose level is constant with respect to time as seen in "c" of FIG. 6 when white light is received.

Figure 9:
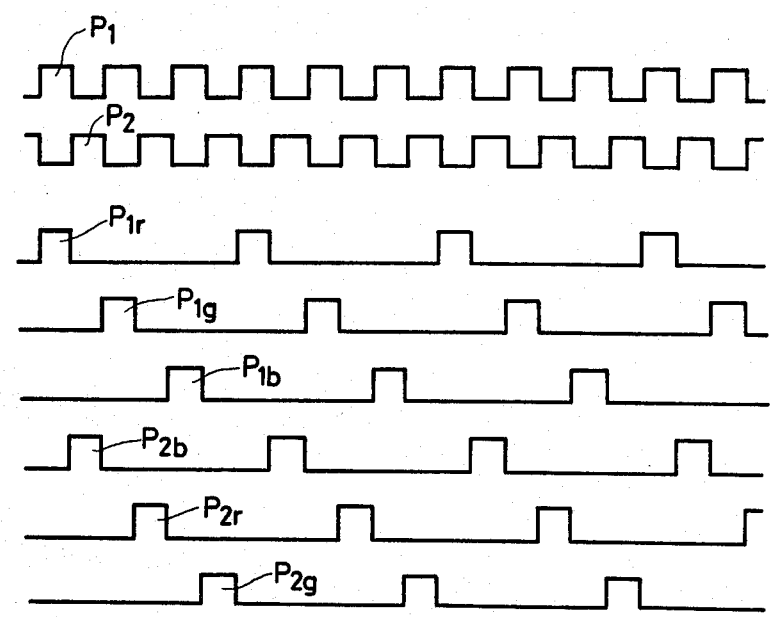
FIG. 9 is a timing chart useful for understanding the operation of the embodiment of FIG. 8.

FIG. 9 shows a timing chart of pulse trains P1 and P2 fed to the sample-and-hold circuits SP1 and SP2, and six other pulse trains P1r, P1g, P1b, P2r, P2g and P2b respectively applied to the sample-and-hold circuits of the sampling circuits SPC1 and SPC2. These pulse signals P1, P2, P1r, P1g, P1b, P2r, P2g and P2b are synchronized such that one of the three sample-and-hold circuits of each of the sampling circuits SPC1 and SPC2 cyclically samples red signals from the output signals of the sample-and-hold circuits SP1 and SP2, and green signals and blue signals are respectively sampled by remaining sample-and-hold circuits of each of the sampling circuits SPC1 and SPC2. In other words, the three color signal components included in the output signals from the sample-and-hold circuits SP1 and SP2 are respectively sampled by respective sample-and-hold circuits of the sampling circuits SPC1 and SPC2 so that level adjusting is performed for each color components by way of the level adjusting circuits LC1r, LC1g, LC1b, LC2r, LC2g and LC2b.

Each of the level adjusting circuits LC1r, LC1g, LC1b, LC2r, LC2g and LC2b comprises a variable resistor with which the gain thereof is adjustable, and these variable resistors may be manually controlled so that output signal levels thereof are equal to each other when reference white light is incident on the optical system. Once the gain of the level adjusting circuits LC1r, LC1g, LC1b, LC2r, LC2g and LC2b is determined so that the variation throughout respective color components represented by FIG. 7 is corrected to the constant amplitude state of FIG. 6, the adder ADD of FIG. 8 produces a multi-color video signal having a desired intensity representing each color component accurately.

From the above it will be understood that the circuit arrangement of FIG. 8 provides effective correction of the amplitude of the output multi-color video signal, and therefore, it is possible to use an optical system showing undesired wavelength response. Because of the correction by way of level adjustment, the frequency component, which is one half the desired doubled frequency, still remaining in the multi-color video signal shown in "c" of FIG. 7 is removed, and therefore, frequency increase is insured while undesirable phenomena such as the appearance of vertical stripe noise on a reproduced picture is effectively avoided.

The above-described embodiments are just examples of the present invention, and therefore, it will be apparent for those skilled in the art that many modifications and variations may be made without departing from the spirit of the present invention.

What is claimed is:

1. A color television camera comprising:
   (a) an optical system for splitting an incident light ray from an object into N rays wherein N is a positive integer greater than 1, each of said N rays providing an identical image of said object or a mirror image thereof;
   (b) N solid-state imaging devices having identical pixel configurations respectively responsive to said N rays from said optical system, each of said imaging devices having pixels arranged in horizontal and vertical directions so that vertically-extending rows of pixels are formed, said rows being disposed at a predetermined horizontal pitch, said imaging devices being disposed such that each succeeding one of said imaging devices is progressively displaced by a distance of 1/N of said horizontal pitch in said horizontal direction relative to an incident identical or mirror image with respect to a preceding one of said imaging devices;
   (c) N color separation stripe filters each having an identical predetermined repetitive pattern of color stripes extending vertically or a pattern which is a mirror image of said repetitive pattern, said color stripes having a horizontal width substantially equal to said horizontal pitch, said N color separation stripe filters being respectively disposed in front of said N imaging devices so that said N rays are respectively subjected to filtration by said N color separation stripe filters before projecting into said N imaging devices;
   (d) pulse generating means for producing N pulse trains of N phases for respectively driving said N imaging devices so that output signals having a predetermined phase difference therebetween are derived from said N imaging devices;
   (e) N sampling circuits for sampling respectively said output signals from said N imaging devices such that each of said output signals from said N imaging devices is sampled at a predetermined interval so that information corresponding to each pixel of said imaging devices is derived, said N sampling circuits being arranged to be successively operated in a predetermined order; and
   (f) combining means responsive to output signals from said N sampling circuits for producing a single multil-color video signal.

2. A television camera as claimed in claim 1, wherein each of said N color separation stripe filters comprises color stripes of red, green and blue.

3. A television camera as claimed in claim 1, wherein each of said N color separation stripe filters comprises color stripes of yellow, green and cyan.

4. A television camera as claimed in claim 1, wherein each of said N imaging devices comprises a charge-coupled device.

5. A television camera as claimed in claim 1, wherein said N sampling circuits are responsive to pulses from said pulse generating means.

6. A television camera as claimed in claim 1, wherein said combining means comprises an adder for adding said output signals from said N sampling circuits to each other.

7. A television camera as claimed in claim 1, wherein said positive integer N is two and there is a phase difference of 180 degrees between said pulse trains.

8. A television camera as claimed in claim 1, wherein said positive integer N is four and there is a phase difference of 90 degrees between said pulse trains.

9. A color television camera comprising:
   (a) an optical system for splitting an incident light ray from an object into N rays wherein N is a positive integer greater than 1, each of said N rays providing an identical image of said object or a mirror image thereof;
   (b) N solid-state imaging devices having identical pixel configurations respectively responsive to said N rays from said optical system, each of said imaging devices having pixels arranged in horizontal and vertical directions so that vertically-extending rows of pixels are formed, said rows being disposed at a predetermined horizontal pitch, said imaging devices being disposed such that each succeeding one of said imaging devices is progressively displaced by a distance of 1/N of said horizontal pitch in said horizontal direction relative to an incident identical or mirror image with respect to a preceding one of said imaging devices;
   (c) N color separation stripe filters each having an identical predetermined repetitive pattern of color stripes extending vertically or a pattern which is a mirror image of said repetitive pattern, said color stripes having a horizontal width substantially equal to said horizontal pitch, said N color separation stripe filters being respectively disposed in front of said N imaging devices so that said N rays are respectively subjected to filtration by said N color separation stripe filters before projecting into said N imaging devices;
   (d) pulse generating means for producing N pulse trains of N phases for respectively driving said N imaging devices so that output signals having a predetermined phase difference therebetween are derived from said N imaging devices;
   (e) N sampling circuits for sampling respectively said output signals from said N imaging devices such that each of said output signals from said N imaging devices is sampled at a predetermined interval so that information corresponding to each pixel of said imaging devices is derived, said N sampling circuits being arranged to be successively operated in a predetermined order;
   (f) N sets of sampling circuits responsive to output signals from said N sampling circuits, each set of the N sets of sampling circuits having three sampling circuits and being responsive to an output signal from one of said N sampling circuits so as to derive three different color output signals, said sampling circuits of the N sets of sampling circuits being arranged to be successively operated in a predetermined order;
   (g) 3N level adjusting circuits respectively responsive to 3N output signals from said N sets of sampling circuits for adjusting the level of output signals from said N sets of sampling circuits; and
   (h) combining means responsive to output signals from said 3N level adjusting circuits for producing a single multi-color video signal.

10. A television camera as claimed in claim 9, wherein each of said N color separation stripe filters comprises color stripes of red, green and blue.

11. A television camera as claimed in claim 9, wherein each of said N imaging devices comprises a charge-coupled device.

12. A television camera as claimed in claim 9, wherein said N sampling circuits are responsive to pulses from said pulse generating means.

13. A television camera as claimed in claim 9, wherein said combining means comprises an adder for adding said output signals from said 3N level adjusting circuits to each other.

14. A television camera as claimed in claim 9, wherein said positive integer N is two and there is a phase difference of 180 degrees between said pulse trains.

15. A television camera as claimed in claim 9, wherein each of said level adjusting circuits comprises a variable gain amplifier.

* * * * *